Feb. 19, 1929. 1,702,371
L. W. WITRY
TRACTOR
Filed Dec. 24, 1923 8 Sheets-Sheet 6
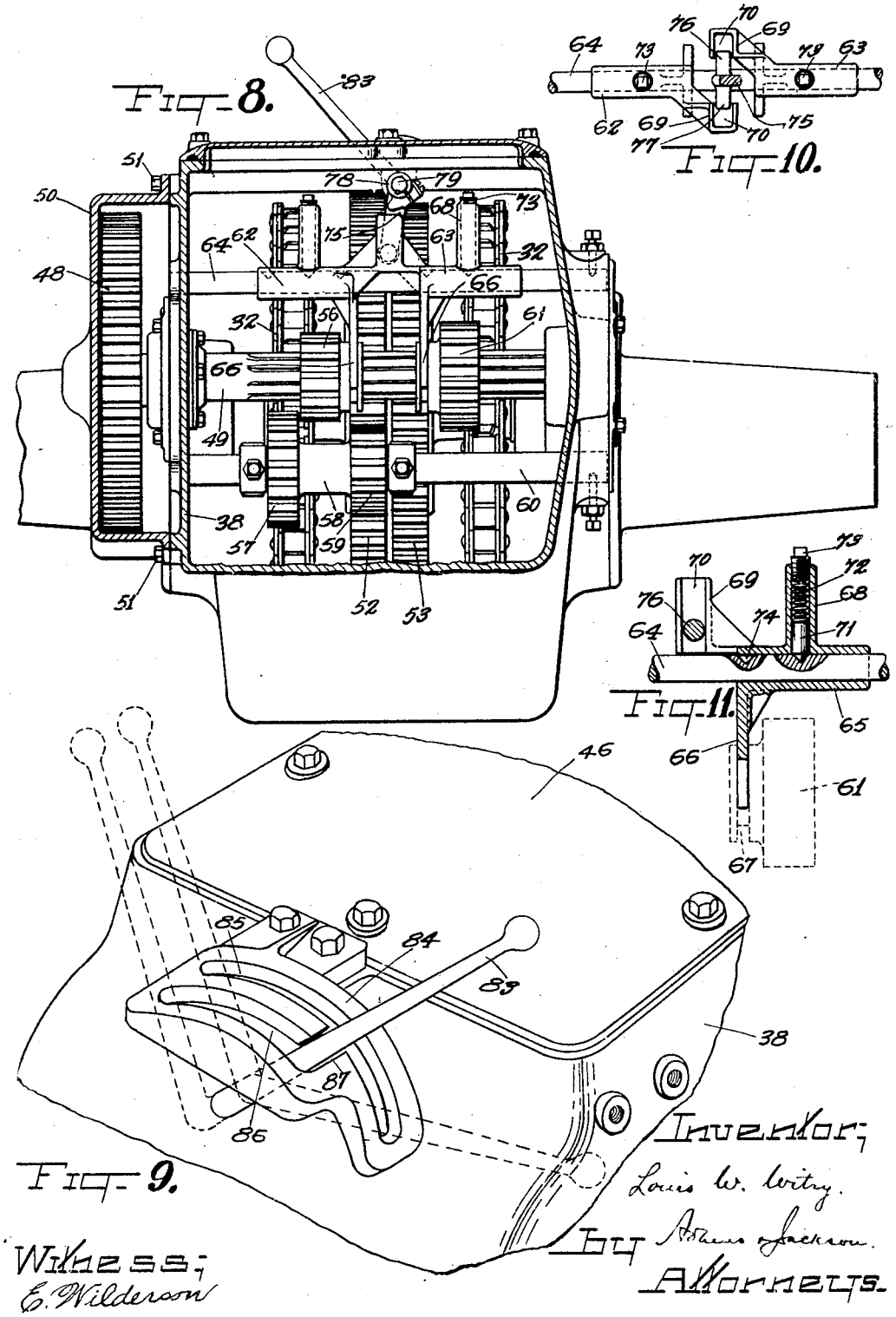

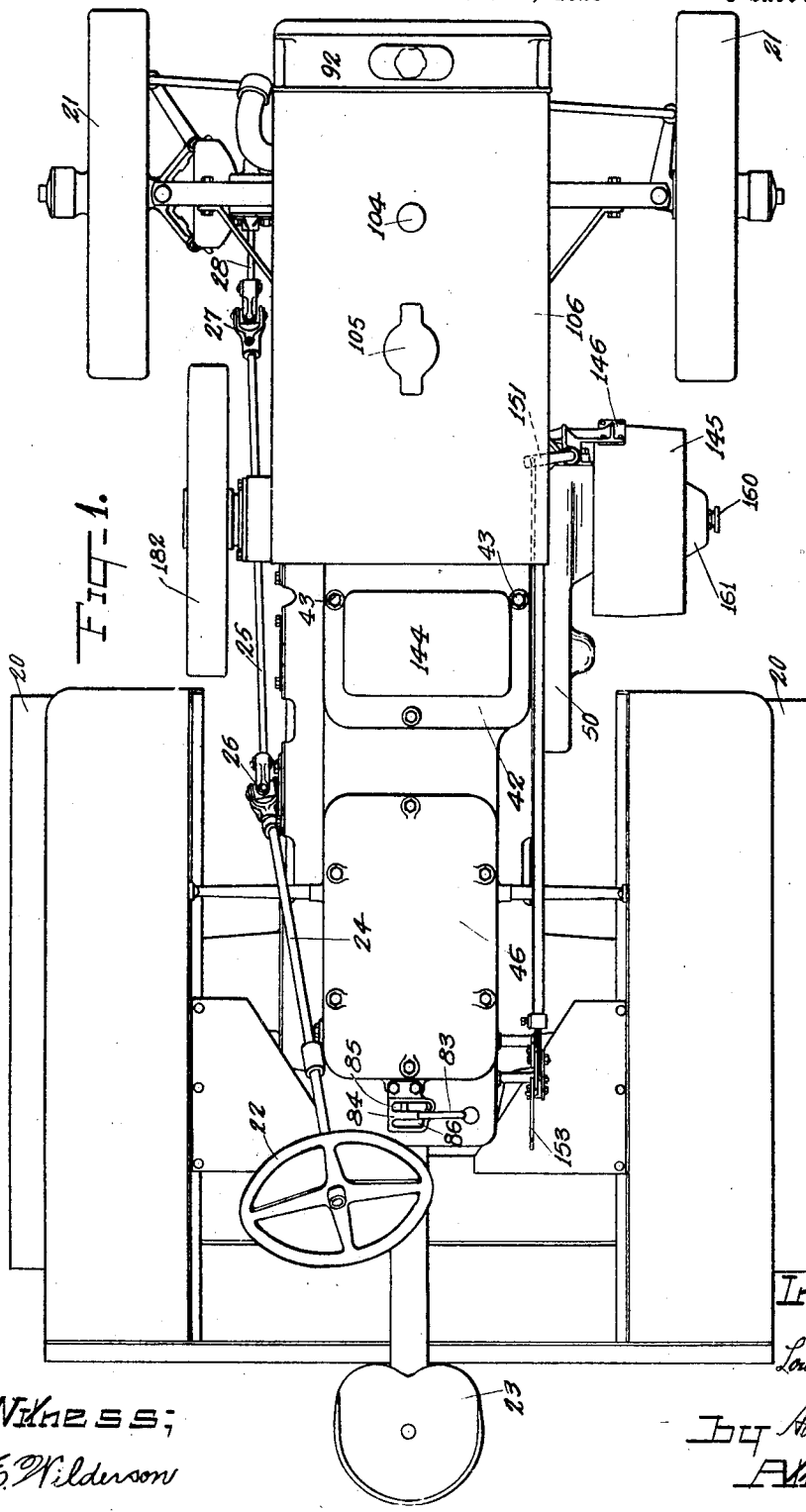

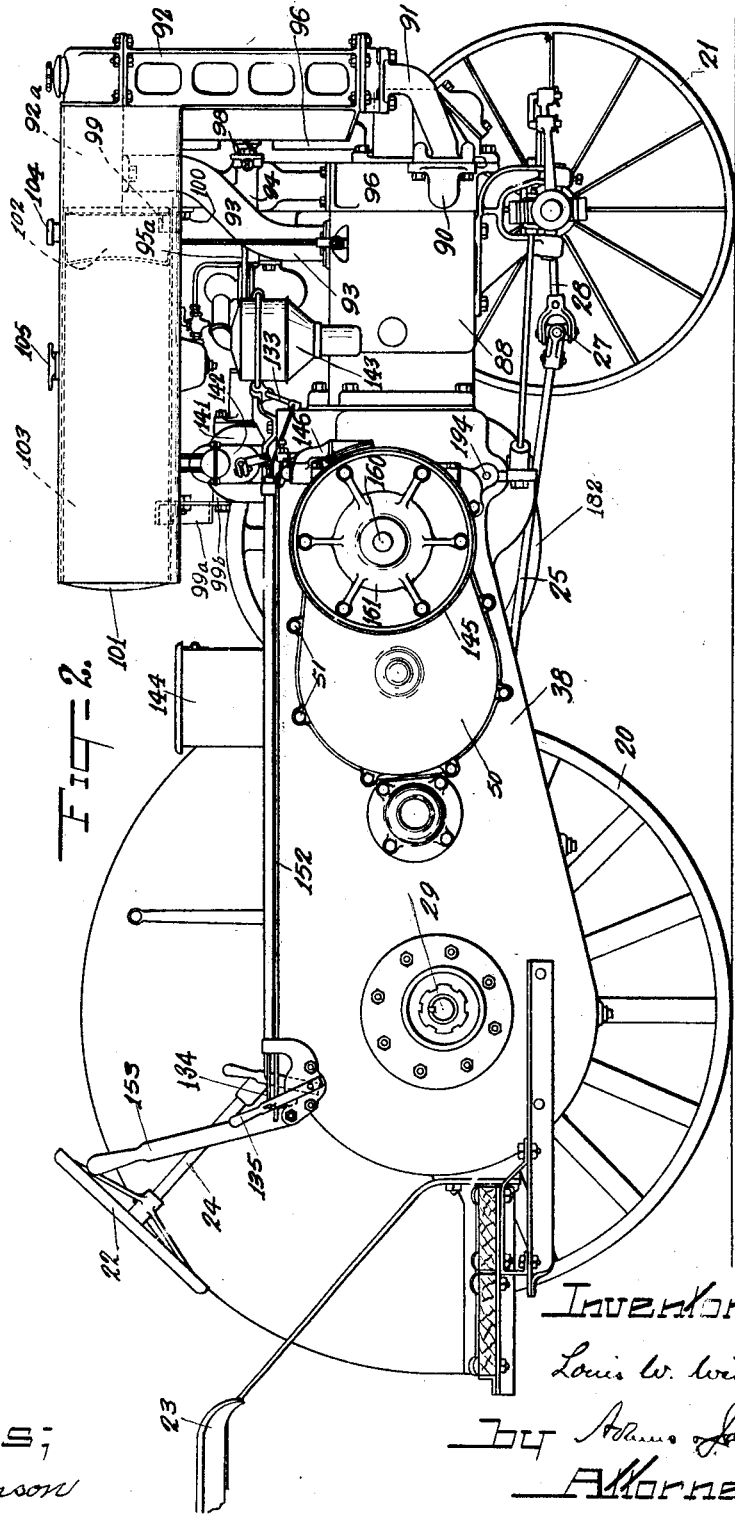

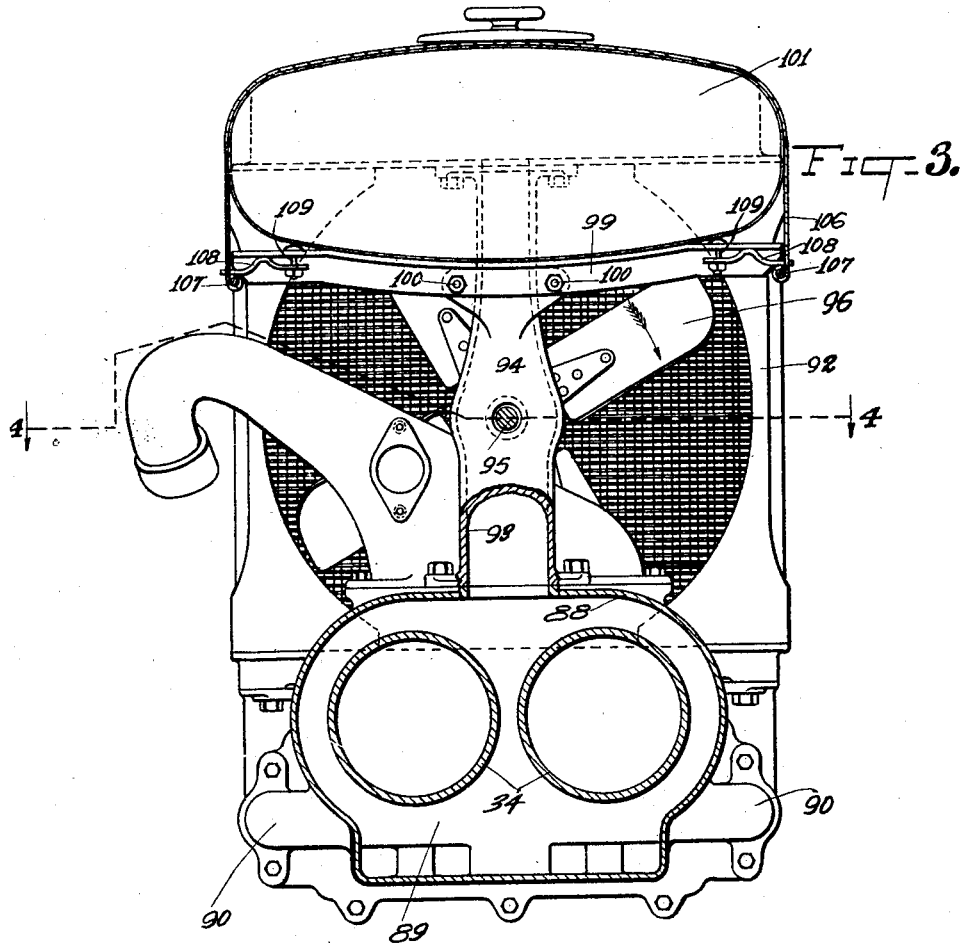
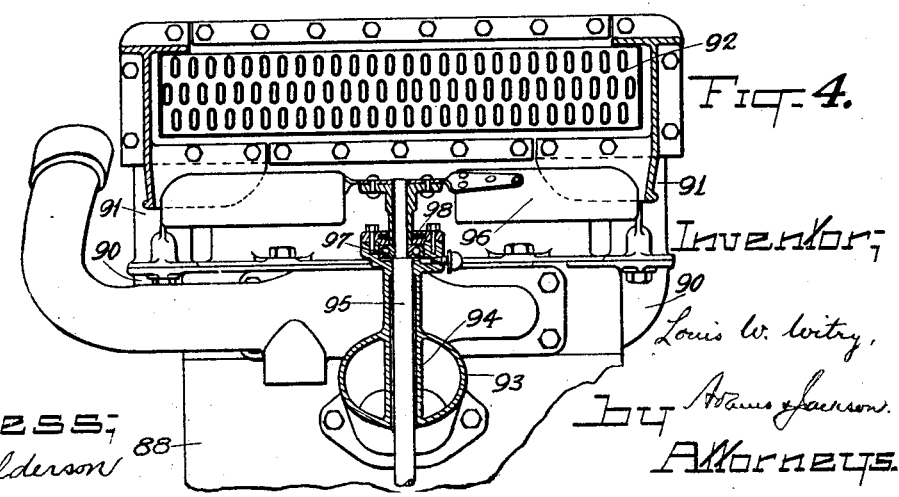

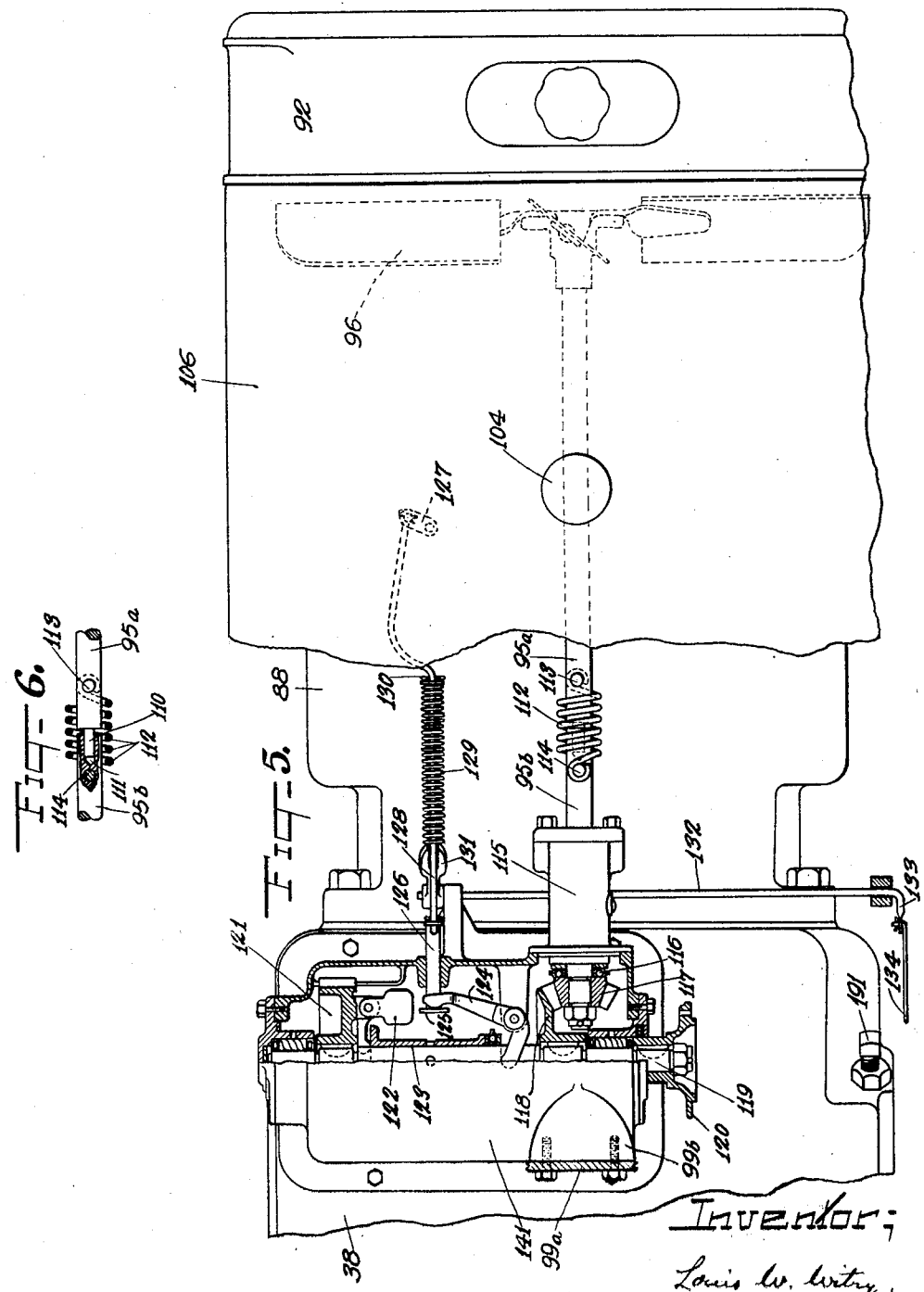

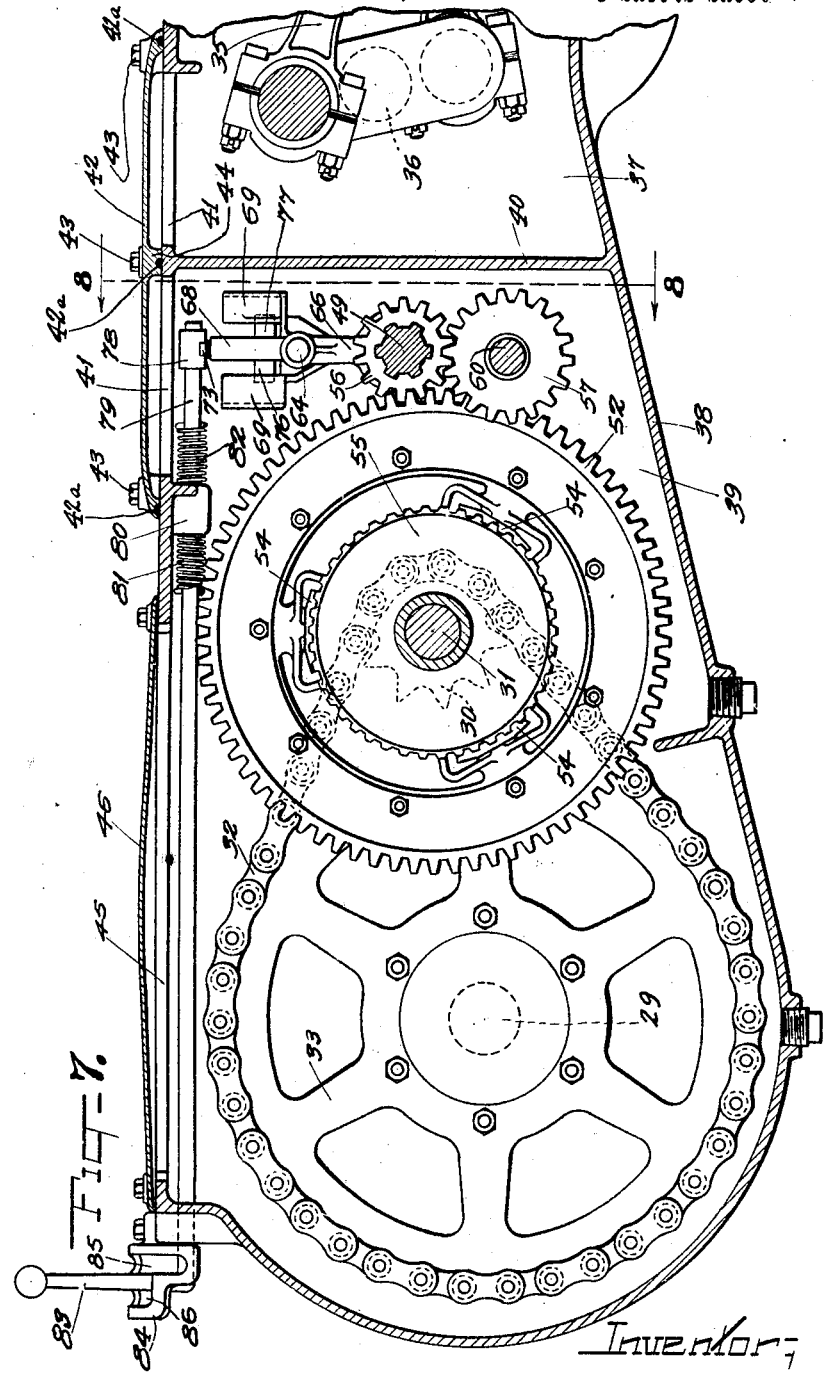

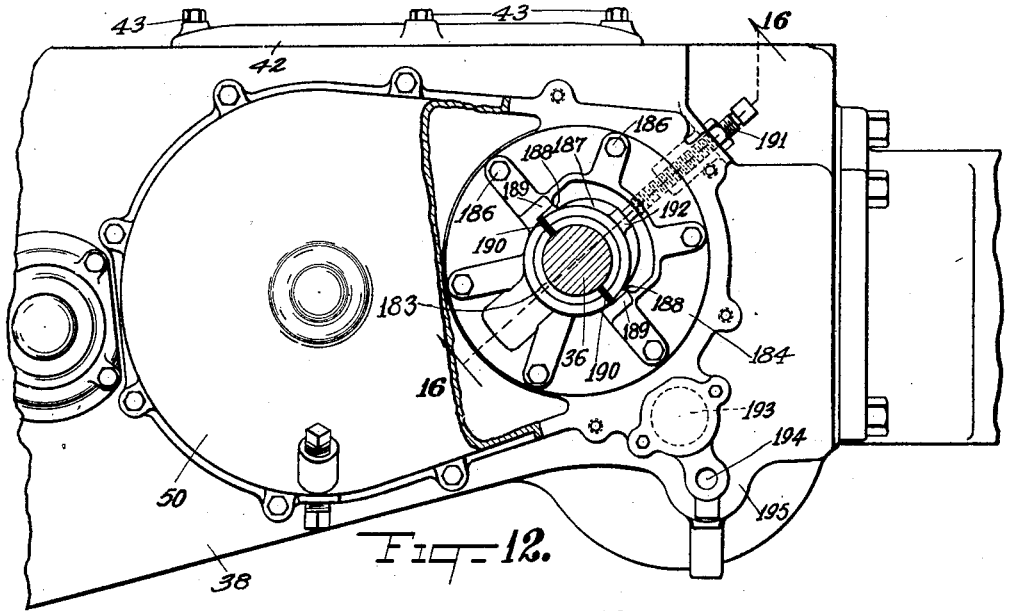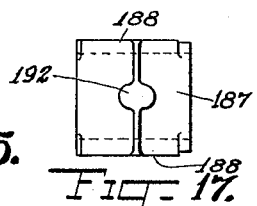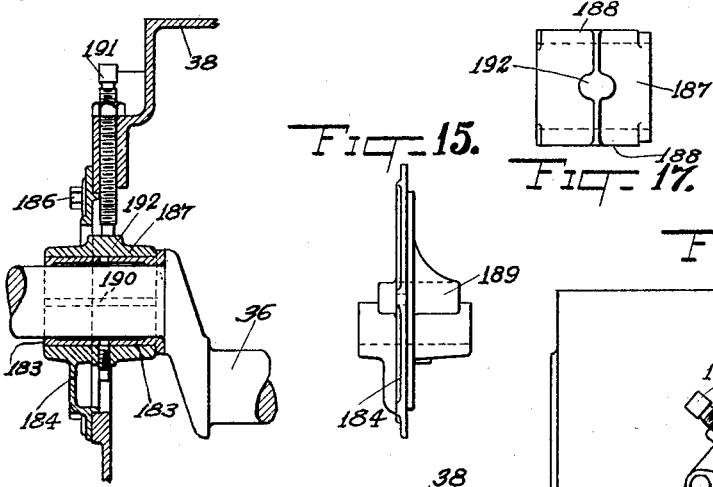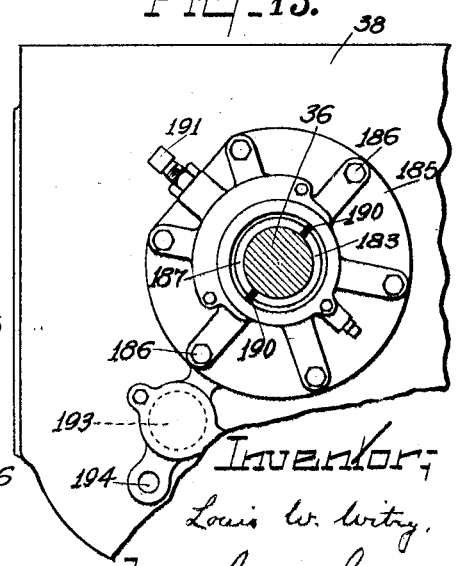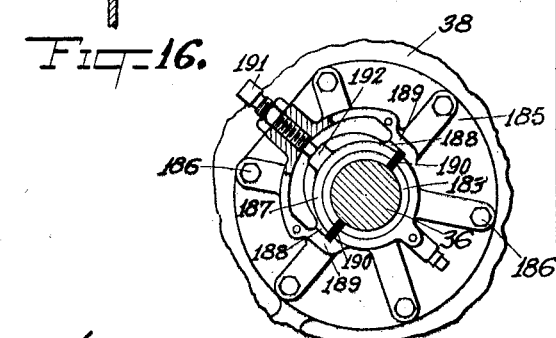

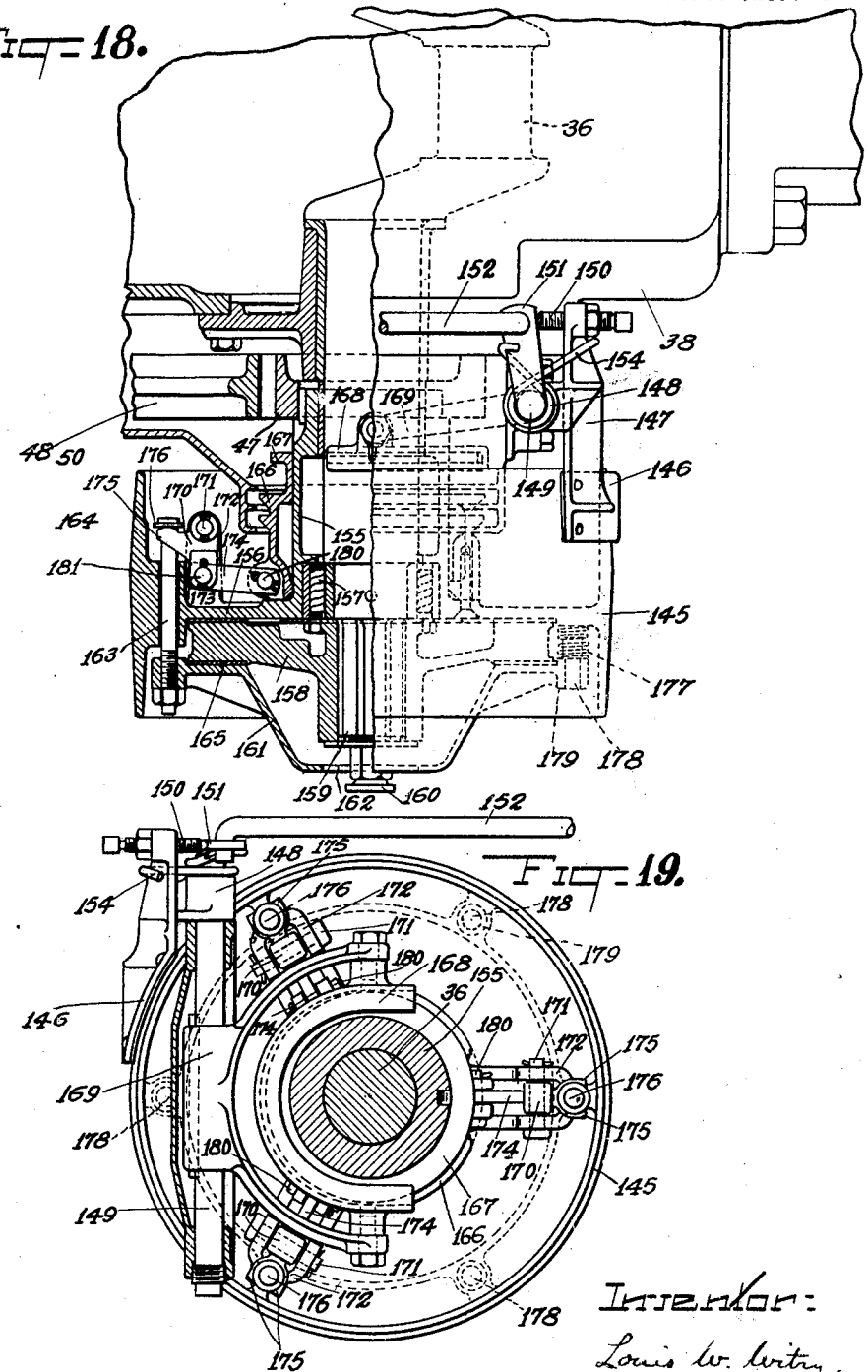

Patented Feb. 19, 1929.

1,702,371

UNITED STATES PATENT OFFICE..

LOUIS W. WITRY, OF WATERLOO, IOWA, ASSIGNOR TO JOHN DEERE TRACTOR COMPANY, OF WATERLOO, IOWA, A CORPORATION OF IOWA.

TRACTOR.

Application filed December 24, 1923. Serial No. 682,401.

My invention relates to tractors, such as are ordinarily used for farming operations, and has for its object to provide certain improvements by which the construction of the tractor will be simplified and cheapened without detracting from its efficiency or strength; by which proper lubrication of certain operating parts thereof will be assured; by which the crank shaft bearings may be readily adjusted to compensate for wear; and by which the construction and operation of such tractors will in other respects, hereinafter pointed out, be improved. I accomplish this object as illustrated in the accompanying drawings and as hereinafter described. What I regard as new will be set forth in the claims.

In the drawings,—

Fig. 1 is a plan view of my improved tractor;

Fig. 2 is a side elevation thereof;

Fig. 3 is a vertical cross-section through the forward portion of the cylinder block and fuel tank showing the radiator, the fan and other associated parts;

Fig. 4 is a partial horizontal section on line 4—4 of Fig. 3;

Fig. 5 is a view, partly in plan and partly in section, illustrating the devices for driving the fan and also the governor mechanism;

Fig. 6 is a detail, partly in section, illustrating the construction of the joined fan driving shaft;

Fig. 7 is a longitudinal vertical sectional view illustrating the arrangement of the crank shaft and the variable speed gears and the separate chambers in which they are respectively mounted;

Fig. 8 is a cross-section on line 8—8 of Fig. 7 illustrating the driving gears by means of which speed changes are effected;

Fig. 9 is a perspective view of the gear shift lever and its mounting;

Fig. 10 is a detail, being a plan view of part of the gear shift mechanism, the gear shift lever being in section;

Fig. 11 is a longitudinal vertical sectional view of some of the parts shown in Fig. 10;

Fig. 12 is a view, partly in side elevation and partly in section, illustrating the construction of the crank shaft bearings and means by which wear is taken up;

Fig. 13 is a partial side elevation of the opposite side of the housing which encloses the transmission gearing showing the crank shaft in section;

Fig. 14 is a view similar to that illustrated in Fig. 12, but showing certain parts in section;

Fig. 15 is an edge view illustrating the construction of the removable plates which carry the lower members of the crank shaft bearings;

Fig. 16 is a section on line 16—16 of Fig. 12;

Fig. 17 is a plan view of one of the upper crank shaft bearing members;

Fig. 18 is a view, partly in plan and partly in section, illustrating the arrangement of the clutch mechanism; and Fig. 19 is a vertical cross-sectional view showing the devices for operating the clutch mechanism and also the brake mechanism.

Referring to the drawings, which illustrate the preferred embodiment of my invention,— 20 indicates the rear traction wheels and 21 the front steering wheels, the latter being arranged to be steered in the usual way by means of a hand steering wheel 22 in juxtaposition to the driver's seat 23 which is at the rear of the tractor, as shown in Fig. 1. The steering wheel 22 is carried by a shaft 24 connected by a rod 25 and universal couplings 26, 27 with a steering shaft 28 by which the steering is accomplished through the usual connections. The traction wheels 20, which may be provided with the usual lugs to prevent slippage, are mounted on rear axle members 29, shown in Fig. 2, which are preferably eccentrically mounted so as to be adjustable toward and from the power transmitting mechanism in the manner shown and described in my pending application, Serial No. 437,287, filed January 14, 1921. The purpose of mounting the rear axle members eccentrically is to permit of their adjustment toward and from the sprocket wheels by which they are driven, as hereinafter described, to vary the tension on the driving chains, but as this construction forms no part of my present invention, it is not believed to be necessary to illustrate and describe it in detail. In Fig. 7 I have, however, illustrated the driving mechanism, which comprises sprocket wheels 30 carried by a counter-shaft 31 and operating to drive chains 32 running over sprocket wheels 33 mounted respectively on the inner ends of the rear axle member 29. The motive power is furnished by an internal combustion motor, preferably a two cylinder engine of the horizontal type, the cylinders of which are disposed side by side longitudinally of the tractor in a horizontal plane, as shown in Fig. 3, in which said cylinders are indicated by the reference numeral 34. The pistons of these cylinders operate through pitmans 35 to drive a transversely-disposed crank shaft 36 mounted at the rear of said cylinders in a chamber 37, shown in Fig. 7, formed by a housing 38 which also contains a chamber 39 in which the sprocket wheels 30, 33 and also the transmission gearing are mounted. The housing 38 together with the cylinder casing hereinafter described constitute the frame of the tractor, the rear axle member 29 being mounted in the rear portion of the housing 38, and the front steering wheels being connected with the front portion of said casing. The two chambers 37, 39 are separated by a partition 40, so that the lubricating oils in the two chambers may be kept separate. Above the partition 40 an opening 41 is provided, normally closed by a cover plate 42 that overlaps the partition and is secured to the housing 38 by bolts 43 or other suitable means. The cover plate 42 is provided with a transverse rib 44 which overlies and rests upon the upper margin of the partition 40 to prevent oil from one of said chambers from being thrown into the other over the partition. Preferably gaskets 42$^a$ are placed between the contacting surfaces of said lid and the housing 38 and partition 40 to insure against leakage. The opening 41 may be used for filling purposes, as well as for permitting access to the interior of the housing 38 for making adjustments or repairs. By extending the cover plate 42 over the partition 40, as described, access to both chambers 37, 39 may be had by removing a single plate. In addition to the opening 41, I preferably provide a larger opening 45 at the rear of the housing 38, closed by a cover plate 46, through which access may be had to the driving mechanism.

The advantage of providing the separate chambers for the motor and the transmission mechanism is that much better lubrication is in that way obtainable. The oil required for the motor must be of a character that will stand heat and some dilution by fuel passing the pistons, while the transmission mechanism requires a lubricating oil of a different character, since the pressures are greater, requiring the use of a heavier oil, which should be protected from dilution by the admission of oil from the crank shaft chamber. The separation of the lubricants is effected and maintained by providing the partition 40, and by providing an outside driving connection between the crank shaft and the transmission gearing in the chamber 39. This driving connection comprises a gear 47 carried by and rotating with a sleeve 155 that is loosely mounted on one end portion of the crank shaft outside of the housing 38, as shown in Fig. 18, and is arranged to be driven by the crank shaft through clutch mechanism, as will be hereinafter described. Said gear meshes with a gear 48 also arranged outside of the housing 38 and mounted on an outwardly projecting end of a drive shaft 49, as shown in Fig. 8. As shown in Fig. 7, the shaft 49 is parallel with the crank shaft 36, but is at the opposite side of the partition 40, its end portions being journaled in suitable bearings at opposite sides of the housing 38, as shown in Fig. 8. The gears 47, 48 are enclosed by a supplemental housing 50 shown in Fig. 8, which is secured to one side of the housing 38 by bolts 51. By this construction it is unnecessary to perforate the partition 40, and consequently, notwithstanding the agitation or throwing about of the oil in the two compartments by the mechanism operating therein, there is no danger of leakage from one compartment into the other, and the necessity of providing costly devices to prevent mixture or dilution of the different lubricants, as has heretofore been customary, is avoided.

Power is transmitted from the drive shaft 49 to the shaft 31, which carries the sprocket wheels 30, through transmission and differential gearing, by which changes in speed and direction may be effected. The differential gearing comprises two spur gears 52, 53 co-axial with the shaft 31 and operatively connected therewith by any suitable differential devices, such, for example, as the bevel gears 54, 55 shown in part in Fig. 7. As the construction of the differential gearing is not a part of my present invention, it requires no further explanation. The drive shaft 49 is arranged to be operatively connected with the spur gear 52 to drive the tractor in a forward direction at low speed by a pinion 56 which rotates with said shaft and is movable longitudinally thereof into or out of engagement with the spur gear 52, as shown in Fig. 8. Said pinion is also movable into engagement with a pinion 57 mounted on one end of a sleeve 58 that also carries a pinion 59 constantly in mesh with the spur gear 52. This sleeve is mounted on a shaft 60 suitably supported in the side portions of the housing 38. The pinion 56 when in its neutral position lies between the pinion 57 and the gear 52, so that by moving it in one direction it may be brought into engagement with the pinion 57, and by moving it in the opposite direction it will engage the gear 52. This arrangement provides for slow speed in either a forward or reverse direction. For driving the tractor at high speed in a forward direction a pinion 61 similar to the pinion 56, but of larger diameter, is mounted on the shaft 49 so as to be movable longitudinally thereof but to rotate therewith.

The pinion 61 is disposed so as to be movable into and out of engagement with the spur gear 53 which, as shown in Fig. 8, is preferably of smaller diameter than the gear 52. The normal or neutral position of the pinion 61 is shown in Fig. 8, from which it will be seen that it is at the opposite side of the gears 52, 53 from the pinion 56.

For separately shifting the pinions 56, 61 longitudinally of the shaft 49 into or out of operative position, I provide two gear shifters 62, 63, the construction of which is best shown in Figs. 8, 10 and 11. These gear shifters, which are exactly alike in construction, are mounted oppositely to each other on a transverse shaft or rod 64 disposed parallel with the shaft 49 and supported in the side portions of the housing 38 at a point above said shaft, as shown in Fig. 8. Said gear shifters are movable longitudinally of said shaft independently of each other within the range permitted by the stroke of a gear shift lever hereinafter described. As best shown in Figs. 10 and 11, each of such gear shifters comprises a sleeve 65 which fits slidably on the shaft 64; a depending fork 66 rigidly connected with the sleeve 65 and adapted to fit in an annular groove 67 provided at one side of each of the pinions 56, 61, as shown in Fig. 8; a sleeve 68 disposed perpendicularly relatively to the sleeve 65, and an upright arm 69 having a groove 70 extending longitudinally of the inner face thereof, as shown in Fig. 10. Within each of the sleeves 68 is mounted a dog 71 pressed downwardly by a spring 72, the upper end portion of which abuts against a screw plug 73 fitted in the upper end of the sleeve 68. The lower or outer end of each dog 71 is tapered to adapt it to fit in one or another of several notches 74 formed in the rod 64 in operative relation to each of the sleeves 65. The purpose of the dogs 71 and notches 74 is to yieldingly lock the sleeves 65 either in operative or inoperative position. From the foregoing description it will be understood that the gear shifter 62 is movable along the rod 64 to shift the pinion 56 from its neutral position either into engagement with the gear 52 or into engagement with the pinion 57, and that when in any of its positions said gear shifter will be held against accidental movement by means of the dog 71 and the notches 74 in that end portion of the rod 64. Three of such notches are provided in connection with the gear shifter 62, since it is movable into three positions. In like manner the gear shifter 63 is movable longitudinally of the rod 64 to move the pinion 61 into or out of mesh with the gear 53, but in connection with said gear shifter only two notches 74 are necessary. When the two gear shifters 62, 63 are in their respective neutral positions, the grooves 70 in their arms 69 are opposite each other, as shown in Fig. 10, and extending between said arms is an actuating arm 75 provided at opposite sides thereof with studs 76, 77, as shown in Fig. 10. These studs are of such length that when the arm 75 is in its neutral position they project slightly into the opposite groove 70, but by moving the arm 75 toward one or the other of the arms 69 either the stud 76 may be moved into the groove 70 of the gear shifter 63, at the same time moving the stud 77 so as to clear the opposite groove 70 of the gear shifter 62, or vice versa. The arm 75 depends from a collar 78 at the forward end of a rock shaft 79 mounted in the upper portion of the housing 38 to slide longitudinally thereof and supported intermediately by a fixed sleeve 80 shown in Fig. 7. Springs 81, 82 at opposite sides of the collar 80 yieldingly hold the rock shaft 79 against endwise movement and tend to restore it to its normal or neutral position. At its rear end said rod is provided with a gear shift lever 83 in a position conveniently accessible to the operator. This lever, by which the rock shaft 79 may either be moved longitudinally or rocked in either direction, is guided by a bracket 84 having a Y slot, i. e., said slot comprises two parallel portions 85, 86, the portion 85 being longer than the portion 86, as shown in Fig. 9, said portions being cross connected by a short slot 87. The bracket 84 is arranged so that the slot 87 extends fore and aft, while the portions 85, 86 are disposed transversely of the tractor, as shown in Fig. 9. The lever 83 is adapted to move in said slots 85, 86, 87, and when in its neutral position lies in the slot 87. Obviously, by moving the lever 83 in a forward direction it will pass into the slot 85 and may then be rocked as far in either direction as said slot will permit. If, however, the lever 83 be moved rearwardly from the position shown in Fig. 9, it will pass into the slot 86 and then may be rocked in said slot. Movement of the lever 83 in a fore or aft direction moves the rock shaft 79 longitudinally of itself, and consequently moves the arm 75 into operative relation with one or the other of the arms 69 and releases it from engagement with the other of said arms. In the arrangement shown, forward movement of the rock shaft 79 causes the arm 75 to engage the gear shifter 62. By then rocking the lever 83 to the right as viewed in Fig. 9, or to the left as viewed in Fig. 8, said gear shifter will be moved longitudinally of the rod 64 to carry the pinion 56 into engagement with the spur gear 52, thus providing for forward drive at slow speed. The other gear shifter will remain in its neutral position, being held there by its dog 71. Rocking of the lever 83 in the slot 85 in the opposite direction will move the gear shifter 62 to the left as viewed in Fig. 8, thereby causing the pinion 56 to engage the pinion 57 and providing for reverse drive. Similarly by moving the lever 83 into the slot 86 the arm 75 will be caused to engage the gear shifter 63, and said gear shifter will be moved on the rod 64 to the left as viewed in Fig. 8, thereby causing the pinion 61 to engage the gear 53 and providing for forward drive at high speed.

It will be noted that in my construction both gear shifters, instead of being mounted on a plurality of rods as has heretofore been the practice, are mounted on the same shaft or rod, which is carried by the housing and is mounted in the transmission chamber so that it is not only enclosed and protected, but also its lubrication is provided for. The shaft 64 is parallel with the shaft 49 which carries the gears to be shifted, and the whole gear shifting assembly is very simple and durable in construction, is economical to manufacture, and may be easily operated and adjusted. The gear shifters 62, 63 being duplicates are interchangeable, which facilitates making repairs. This gear shift arrangement is one which is well adapted to be operated from the rear of the tractor and lends itself to the attachment of extension parts that can be operated from a remote point, as from the seat of an implement drawn behind the tractor.

The prime mover or motor is an internal combustion engine of the water cooled type, designed to use principally kerosene, or equivalent hydrocarbon, but to be started with the use of gasoline, and my present invention provides improved means for maintaining proper circulation of the water and for supporting the fuel reservoir. As shown in Fig. 3, the cylinders 34 of the engine are surrounded by a casing 88 which is secured to the front wall of the housing 38, as shown in Figs. 3 and 5, and provides a chamber 89 through which water circulates around the cylinders 34, thus forming a water jacket for said cylinders, as shown in Fig. 3. Communicating with the lower front corners of the chamber 89 are elbows 90 which are connected by pipes 91 with the opposite lower corners of a radiator 92 of any suitable type placed at the front of the tractor. The purpose of this arrangement is to permit the cool water from the radiator to pass downward at both sides and back to opposite sides of the water jacket or chamber 89. The upper portion of said chamber is connected with the upper portion of the radiator 92 by a tubular standard 93, shown in Figs. 2 and 3, which rises from the upper central portion of the casing 88 and opens into a rearward extension 92ª of the upper portion of the radiator, as indicated by dotted lines in Fig. 2, so that said standard serves to support the radiator. By this means the hot water in the chamber 89 rises through the standard 93 and is delivered to the upper portion of the radiator, whence it passes down through the radiator and after being cooled by the air passing therethrough returns to the chamber 89 through the pipes 91. By providing two outlets from the radiator to the water jacket, the circulation of the water is improved, and it is caused to spread out more in passing through the radiator so that less radiation surface is necessary to properly reduce the temperature of the water. Furthermore, as the exhaust valves are at the forward ends of the cylinders and the water returning from the radiator is delivered to the chamber 89 adjacent to such valves, which are the hottest points of the cylinders, the cooling system operates with the greatest efficiency. The pipes 91 serve also to support the radiator.

In addition to providing a conduit for the return of water from the water jacket to the radiator, the standard 93 serves also as a support for the fuel tank and for the fan shaft. As best shown in Figs. 3 and 4, said standard is provided with a sleeve 94 that extends fore and aft therethrough and for a short distance forward therefrom, said sleeve being preferably formed integral with said standard so that water flowing through the standard cannot escape around said sleeve. Through this sleeve extends the fan shaft 95, on the forward end of which is mounted the usual fan 96 disposed back of and adjacent to the radiator. Preferably an anti-friction bearing 97 is provided for said shaft at the forward end of said sleeve, which bearing is held in place by a bolted cover plate 98 shown in Fig. 4. The construction of the fan shaft and the mechanism for driving it will be hereinafter explained.

As best shown in Fig. 3, the standard 93 is provided near its upper end with a transversely-disposed bar 99 rigidly secured thereto, as by bolts 100, which bar closely underlies and forms a front support for a fuel tank 101, the forward end of which is adjacent to the radiator 92, as best shown in Fig. 2. This fuel tank extends rearwardly over the engine and its equipment, and it is divided into a small front chamber 102 designed to hold gasoline, and a larger rear chamber 103 for kerosene. The rear portion of the fuel tank rests on an angle iron cross-bar 99ª secured intermediately to a shoulder or boss 99ᵇ on the casing of the governor hereinafter referred to. The chambers 102, 103 are respectively provided with filler openings 104, 105. The fuel tank is secured in place on the cross-bar 99 by means of a jacket 106, best shown in Fig. 3, which extends over said tank and is secured at its side margins to the cross-bars 99, 99ª. As best shown in said figure, the side margins of said jacket are provided with rods or beads 107 which are engaged by the outer ends of rocker plates 108 fulcrumed on the cross-bars 99, 99ª and secured thereto at their inner ends by bolts 109. The arrangement is such that the bolts draw the inner ends of said rocker plates upward, and consequently force their outer ends downward so that the side margins of the jacket 106 are drawn downward, thereby tightly binding the fuel tank on the supporting bars 99, 99ª. By this means the fuel tank is held tightly so that it cannot work loose under the jolting of the tractor, and yet it may easily be removed when necessary.

It will be observed that the standard 93 not only supports the upper part of the radiator 92 and its extension 92ª, but also supports the forward portion of the fuel tank and furnishes a bearing support for the fan shaft, and at the same time provides a conduit for the flow or delivery of the water to the radiator, thereby greatly simplifying the construction of the machine and reducing the cost of manufacture, as well as economizing space so as to leave plenty of room around the motor so that it is conveniently accessible for the purpose of making adjustments, etc., which is a very desirable feature.

The construction of the fan shaft 95 is best shown in Figs. 5 and 6, and particularly in the latter figure, from an inspection of which it will be seen that it is composed of two members 95ª, 95ᵇ connected by a flexible connection formed by providing one of said members, as 95ª, with a pin 110, and the other with a socket 111 adapted to receive said pin loosely enough to permit the members 95ª, 95ᵇ to assume an angular position relatively to each other to a limited extent. Said members are also connected by a spring 112, one end of which is connected with the member 95ª by a pin 113, its other end being connected to the member 95ᵇ by a pin 114. The member 95ᵇ is rotated by mechanism that will be hereinafter described, and the torque is transmitted to the member 95ª and the fan by the spring 112. By this construction the fan shaft accommodates itself to any inaccuracy in alinement of the bearings of the members 95ª, 95ᵇ, and therefore permits considerable leeway in manufacture, thereby reducing costs. Also, the spring acts as a cushion and absorbs the shocks of starting, while at the same time a positive drive of the fan is obtained. Obviously, when the engine is started, the inertia of the fan must be overcome, and if the drive connections of the fan are unyielding the ensuing shock is apt to snap the blades of the fan or break the teeth out of the fan drive gears, where such gears are employed, and by my improved construction this danger is avoided, since the spring absorbs the starting shock and causes the fan to start easily. I am thus able to use gears for driving the fan without danger.

The member 95ᵇ of the fan shaft is mounted in a sleeve 115, shown in Fig. 5, through which it extends, and at the rear end of said sleeve is an anti-friction bearing 116. Mounted on the rear end of the member 95ᵇ is a bevel pinion 117 which meshes with and is driven by a gear 118 mounted on a shaft 119, as shown in Fig. 5, which operates the governor and also drives the magneto. While the governor and magneto driving devices are not included in the subject matter of this application, it may be explained in passing that the shaft 119 carries a coupling member 120 through which it is coupled to the magneto, and it also carries a disc or gear 121 to which are attached centrifugally actuated bell-cranks 122 which act to move a sleeve 123 longitudinally of the shaft 119 to control the position of a bell-crank lever 124. This lever engages a head 125 at the rear end of an endwise movable shaft 126 connected to a throttle 127 by a rod 128. On this rod is a spring 129, the forward end of which bears against a pin 130 carried by said rod, while its other end bears against an arm 131 carried by a transversely-disposed rock shaft 132, at one end of which is a crank 133 connected by a rod 134 with the usual throttle lever 135 shown in Fig. 2. The arrangement is such that increasing speed of the engine tends to move the sleeve 123 toward the bell-crank lever 124, thereby rocking said lever so as to move the shaft 126 to the left as viewed in Fig. 5, which movement tends to close the throttle and puts the spring 129 under greater tension. Slowing down of the engine permits the sleeve 123 to move in the opposite direction, whereupon the spring 129 tends to open the throttle.

The shaft 119 is driven from the crank shaft through the gear 121, but as any suitable means may be used for that purpose, it is believed to be unnecessary to illustrate or describe this subject matter in detail. The assembly of the several parts last described is shown in Fig. 2, in which 141 indicates a casing which encloses the governor mechanism and also the drive gears by which the fan shaft is driven, and 142 indicates the magneto. The part 143 shown in said figure is an air cleaner through which air supplied to the mixing chamber is cleansed from dust. The part 144 is a tool box.

The clutch mechanism through which power is transmitted from the crank shaft 36 to the pinion 47 which drives the gear 48 is best shown in Figs. 18 and 19, and comprises a pulley 145 which serves not only as a clutch member, but also as a belt pulley and a braking surface, the periphery of said pulley adjacent to the inner margin thereof being adapted to engage a brake shoe 146 carried by a lever 147 which is fulcrumed intermediately at 148 on a shaft 149, that is journaled in a suitable bearing carried by the supplemental housing 50, as best shown in Figs. 1, 18 and 19. The inner end of the lever 147 carries an adjustable set screw 150 which bears against an arm 151 carried by the shaft 149 and connected by a rod 152 with a clutch operating lever 153, shown in Fig. 2, the latter lever being placed adjacent to the driver's seat. The arrangement is such that when said clutch lever is actuated to throw out the clutch, as will be hereinafter described, it moves the arm 151 to the right as viewed in Fig. 18, thereby rocking the lever 147 in a clockwise direction and moving the brake shoe 146 into engagement with the pulley 145. When the clutch is thrown in, the arm 151 moves in the opposite direction, whereupon the brake is released by means of a spring 154 mounted on the shaft 149 and having its ends connected with the arm 151 and the lever 147, as shown in Fig. 18. When the brake is off, this spring also serves the purpose of keeping the brake shoe from flapping against the pulley incident to vibration of the tractor. The pressure of the brake may be varied by adjusting the set screw 150.

The pulley 145 is rotatably or loosely mounted on one end portion of the crank shaft 36 that projects out of the housing 38 at one side thereof, by means of the sleeve 155, which is connected to the pulley by a web 156, shown in Fig. 18, an anti-friction bearing 157 being preferably interposed between the sleeve 155 and the crank shaft, and the sleeve 155 is capable of slight movement longitudinally of the crank shaft 36 and independently of the gear 47, which is driven by said sleeve. The outer face of the web 156 is designed to provide a friction clutching surface which co-acts with a clutch member 158 in the form of a disc non-rotatably secured to the adjacent end portion of the crank shaft 36, and held in place preferably by a plate 159 and cap screw 160. The disc 158 is double faced, and its outer face is adapted to be frictionally engaged by a clutch member 161 which serves also as a cover plate to enclose and protect the clutch elements. The member 161 is provided with an opening 162 for the passage of the cap screw 160, as shown in Fig. 18. Said clutch member is connected with the pulley 145 by a number of bolts 163 fitted in bosses 164 in the surface of the pulley 145, as shown in said figure, so that said bolts may move longitudinally in said bosses while at the same time the clutch member 161 is caused to rotate with said pulley. It will be evident that by moving the clutch member 161 toward the web 156 of said pulley, the disc 158 will be clamped between said members, thereby causing the pulley 145, the sleeve 155, and the gear 47, to rotate with the crank shaft. Preferably the engaging surfaces of the clutch members are provided with a suitable lining, as indicated at 165 in Fig. 18, to provide better contact and take up wear. The member 161 is moved toward and from the web 156 to throw the clutch in or out by means of a sleeve 166 mounted on the sleeve 155 to move longitudinally thereof, said sleeve being provided with an annular flange 167 which is embraced by a semi-circular grooved collar 168 carried by a yoke 169 mounted on and rocking with the shaft 149. The arrangement is such that by rocking said shaft the collar 168 may be moved longitudinally of the crank shaft, thereby moving the sleeve 166 longitudinally upon the sleeve 155. This movement of such sleeve operates to move the clutch members 161 and 156 to clamp the disc 158 between them, through the instrumentality of a series of bell-crank levers 170 fulcrumed at 171 on standards 172 carried by the web 156 of the pulley 145. One arm 173 of each of such bell-crank levers is connected by a link 174 with the sleeve 166, while the other arm, 175, of each of said levers extends under the head 176 of one of the bolts 163. By this construction when the sleeve 166 is moved toward the web 156, the toggles comprising the links 174 and arms 173 cause the bell-crank levers 170 to rock in a clockwise direction as viewed in Fig. 18, thereby drawing up the bolts 163 and consequently moving the clutch members 156 and 161 toward the disc 158 and clamping said disc between the opposing friction surfaces. Movement of the sleeve 166 in the opposite direction releases the tension on the bolts 163 and permits the clutch members 156 and 161 to move away from the disc 158 under the action of springs 177 interposed between the web 156 and the clutch member 161, as indicated by dotted lines in Figs. 18 and 19. These springs are preferably mounted on posts 178 projecting from bosses 179 carried by the clutch member 161. As indicated in Fig. 18, the toggle connections between the sleeve 166 and the bell-crank levers 170 are so designed that in throwing in the clutch the sleeve 166 moves far enough to carry the pivots 180 connecting the links 174 with said sleeve past center with respect to the pivots 181 connecting said links with the arms 173, thereby locking the clutch members in engagement with each other. Therefore, when the clutch has been thrown in, it stays in until released by the operator, and vice versa, when thrown out it stays out until shifted by the operator. By this construction I provide a balancing clutch closing pressure between the two clutch elements at opposite sides of the intermediate or driving clutch element 158, so that the engagement between the clutch surfaces is uniform. Also, by mounting the sleeve 155 intermediately on the outwardly extending portion of the crank shaft, between the adjacent bearing thereof on the frame, and the clutch mechanism at the outer end of the crank shaft, I provide a substantial mounting for the clutch operating parts and the driving connections, which renders unnecessary the use of an outside support or bracket for the clutch, and consequently there is no overhang to spring or yield. Also, as the clutch is practically enclosed, it is protected from dust and dirt.

Preferably the crank shaft 36 carries a fly-wheel 182 mounted on the opposite end from that which carries the belt pulley 145, as shown in Fig. 1.

The crank shaft is mounted in bearings carried by the side walls of the housing 38, and located between the top and bottom planes thereof, comprising fixed semi-cylindrical members 183 carried by detachable bearing plates 184, 185 secured to the opposite side walls of the housing 38 over large openings therein, the bearing plate 184 being placed within the housing 50, as shown in Fig. 12. These plates are secured in place by bolts 186 so that they may be readily removed when necessary, to expose the openings covered by them, and thereby permit of ready access to the interior of the housing. As shown in Figs. 13 and 16, these openings are preferably made large enough so that the crank shaft may be inserted, or withdrawn, through them. Said bearing plates serve the further purpose of stiffening the side walls of the housing, and distributing to a wide extent the strains incident to the operation of the motor. Cooperating with the bearing members 183 are semi-cylindrical bearing members 187 which are adjustable relatively to the bearing members 183, said bearings 187 being provided at their opposite side margins with blocks 188 adapted to bear against shoulders 189 formed on the bearing plates 184, 185 adjacent to the side margins of the bearing members 183, as shown in Figs. 12 and 14. By this arrangement the bearing members 187 may be moved toward and from the bearing members 183, but are held against lateral movement. Both the bearing members 183 and 187 are suitably lined with anti-friction metal, and shims 190 are placed between their abutting side margins, as indicated in said figures. The bearing members 187 are adjusted relatively to the bearing members 183, from outside the housing by means of set screws 191 threaded in the housing 38 or in the bearing plate 185 and seated at their inner ends on a boss 192 centrally located in the outer surface of the bearing members 187, as shown in Figs. 12 and 17. Obviously, by adjusting the set screws 191 the bearing members 187 may be moved toward or from the bearing members 183 to compensate for wear. The number of shims 190 used depends, of course, on the condition of the bearing. These shims are originally inserted between the two members of the bearing in the usual manner, and after wear occurs and follow-up adjustment is to be made, a sufficient number of shims are removed to allow the desired movement of the cap member 187 of the bearing by means of the screw 191. My improved construction therefore provides for ready adjustment of either of the bearings of the crank shaft by the adjustment of the single screw.

The engine is provided with a cam shaft 193, as usual, said cam shaft being located below and forward of the crank shaft 36, as indicated by dotted lines in Fig. 12. Below said cam shaft is a cam follower shaft 194 which is disposed transversely of the housing 38 in the lower front portion thereof so that these parts run in oil, and consequently are always well lubricated. To ensure an adequate supply of oil at this point, the housing 38 is provided with a well or pocket 195 below the shaft 194, as illustrated in Fig. 12.

What I claim as my invention and desire to secure by Letters Patent, is—

1. In a tractor, the combination with a motor, and traction wheels, of a housing, a transverse partition in said housing forming separate chambers therein, transmission gearing in one of said chambers operatively connected with the traction wheels, a motor driven crank shaft in the other chamber journaled in bearings in the opposite side walls of the housing, said crank shaft extending out of the housing at one side thereof, a sleeve loosely mounted on said crank shaft outside of the housing, means outside of the housing forming a driving connection between said sleeve and said transmission gearing, and clutch mechanism mounted on the outer end portion of the crank shaft and operable to connect or disconnect said sleeve and the crank shaft.

2. In a tractor, the combination with a motor, and traction wheels, of a housing, a transverse partition in said housing forming separate chambers therein, transmission gearing in one of said chambers operatively connected with the traction wheels, a motor driven crank shaft in the other chamber journaled in bearings in the opposite side walls of the housing, said crank shaft extending out of the housing at one side thereof, a sleeve loosely mounted upon the outwardly extending portion of said crank shaft, a gear non-rotatably connected with the inner end portion of said sleeve, a driving connection between said gear and the transmission gearing, and means at the outer end of said crank shaft for connecting and disconnecting said sleeve and the crank shaft.

3. In a tractor, the combination with a motor, and traction wheels, of a housing, a transverse partition in said housing forming separate chambers therein, transmission gearing in one of said chambers operatively connected with the traction wheels, a motor driven crank shaft in the other chamber journaled in bearings in the opposite side walls of the housing, said crank shaft extending out of the housing at one side thereof, clutch mechanism mounted on the outer end portion of the crank shaft, a sleeve loosely mounted intermediately on the outwardly extending portion of the crank shaft and adapted to be operatively connected therewith by said clutch mechanism, and a drive shaft parallel with said crank shaft and geared to the inner end portion of said sleeve and to the transmission gearing.

4. In a tractor, the combination with a motor, and traction wheels, of a housing, a transverse partition in said housing forming separate chambers therein, transmission gearing in one of said chambers operatively connected with the traction wheels, a motor driven crank shaft in the other chamber journaled in bearings in the opposite side walls of the housing, said crank shaft extending out of the housing at one side thereof, clutch mechanism mounted on the outer end portion of the crank shaft, a sleeve loosely mounted intermediately on the outwardly extending portion of the crank shaft, a gear non-rotatably connected with the inner end portion of the sleeve, a gear meshing with said first mentioned gear and connecting the same with said transmission gearing, a supplemental housing enclosing said gears, and means supported by the supplemental housing and operable to actuate said clutch mechanism to connect or disconnect said sleeve and the crank shaft.

5. In a tractor, the combination with a motor, and traction wheels, of a housing, a transverse partition in said housing forming separate chambers therein, transmission gearing in one of said chambers operatively connected with the traction wheels, said housing having openings between the upper and lower margins of its side walls opposite the other chamber, bearing plates secured over said openings, a motor driven crank shaft extending across the latter chamber and journaled in bearings carried by said bearing plates, one end of said crank shaft extending outside of the housing, clutch mechanism mounted on the outer end portion of said crank shaft, a sleeve loosely mounted on said crank shaft between said clutch mechanism and the adjacent side wall of the housing, and adapted to be connected with the crank shaft by said clutch mechanism, and gearing forming a driving connection between said sleeve and the transmission gearing.

6. In a tractor, the combination with a motor, and power operated traction wheels, of a housing, a transverse partition in said housing forming separate chambers therein, transmission gearing in one of said chambers operatively connected with the traction wheels, said housing having openings between the upper and lower margins of its side walls opposite the other chamber, bearing plates secured over said openings, a motor driven crank shaft extending across the latter chamber and journaled in bearings carried by said bearing plates, one end of said crank shaft extending outside of the housing, clutch mechanism mounted on the outer end portion of said crank shaft, a sleeve loosely mounted on said crank shaft between said clutch mechanism and the adjacent side wall of the housing, and adapted to be connected with the crank shaft by said clutch mechanism, a gear non-rotatably secured to the inner end portion of said sleeve, a gear connecting said gear with the transmission gearing, and a supplemental housing enclosing said gears.

7. In a tractor, the combination with a motor, and traction wheels, of a housing, a transverse partition in said housing forming separate chambers therein, transmission gearing in one of said chambers operatively connected with the traction wheels, a motor driven crank shaft extending transversely of the other chamber, bearings supporting said crank shaft on the side walls of said housing to rotate between the planes of the upper and lower margins thereof, and means outside of the housing, forming a driving connection between said crank shaft and said transmission gearing.

8. In the tractor, the combination with a motor, and traction wheels, of a housing, a transverse partition in said housing forming separate chambers therein, transmission gearing in one of said chambers operatively connected with the traction wheels, a motor driven crank shaft extending transversely of the other chamber, bearings supporting said crank shaft on the side walls of said housing to rotate between the planes of the upper and lower margins thereof, means outside of the housing forming a driving connection between said crank shaft and said transmission gearing, an opening in the top of the housing over the latter chamber, and a removable cover plate for said opening.

9. In a tractor, the combination with a motor, and traction wheels, of a housing, a transverse partition in said housing forming separate chambers therein, transmission gearing in one of said chambers operatively connected with the traction wheels, a crank shaft extending transversely of the other chamber, bearings for said crank shaft in the side walls of said housing between the planes of the upper and lower margins thereof, means outside of the housing forming a driving connection between said crank shaft and said transmission gearing, an opening in said housing over said chambers, and a cover plate for said opening, said cover plate having means adapted to cooperate with said partition to complete the closure between said chambers.

10. In a tractor, the combination with a frame comprising a housing, of a cylinder casing secured to the front wall of said housing, a horizontal cylinder mounted in said casing and extending longitudinally thereof, a transverse partition in said housing forming separate front and rear chambers, transmission gearing in said rear chamber, a transversely disposed crank shaft mounted in bearings in the walls of the housing at opposite sides of said front chamber, traction wheels mounted at the rear of said housing and connected with said transmission gearing, a piston operating in said cylinder and connected with said crank shaft, means outside of the housing for driving said transmission gearing from said crank shaft, and steering wheels at the front of the tractor.

11. In a tractor, the combination with a frame comprising a housing, a cylinder casing secured to the front wall thereof, a horizontal cylinder extending longitudinally of said casing, a transverse partition in said housing forming separate front and rear chambers therein, transmission gearing in said rear chamber, traction wheels at the rear driven by said transmission gearing, a transversely disposed crank shaft in said front chamber, a piston operating in said cylinder for driving said crank shaft, said front chamber having openings in the opposite side walls thereof between the planes of their upper and lower margins, bearing plates secured to the side walls of the housing over said openings, and supporting bearings for said crank shaft, and steering wheels at the front of the tractor.

12. In a tractor, the combination with a frame comprising a housing, a cylinder casing secured to the front wall thereof, a horizontal cylinder extending longitudinally of said casing, a transverse partition in said housing forming separate front and rear chambers therein, transmission gearing in said rear chamber, traction wheels at the rear driven by said transmission gearing, a transversely disposed crank shaft in said front chamber, a piston operating in said cylinder for driving said crank shaft, said front chamber having openings in the opposite side walls thereof between the planes of their upper and lower margins, bearing plates secured to the side walls of the housing over said openings, and supporting bearings for said crank shaft, means outside of the housing for driving said transmission gearing from the crank shaft, and steering wheels at the front of the tractor.

13. In a tractor, the combination with a frame comprising a housing, a cylinder casing secured to the front wall thereof, a horizontal cylinder extending longitudinally of said casing, a transverse partition in said housing forming separate front and rear chambers therein, transmission gearing in said rear chamber, traction wheels at the rear driven by said transmission gearing, a transversely disposed crank shaft in said front chamber, a piston operating in said cylinder for driving said crank shaft, said front chamber having openings in the opposite side walls thereof between the planes of their upper and lower margins, bearing plates secured to the side walls of the housing over said openings, and supporting bearings for said crank shaft, means mounted on the crank shaft outside of the housing, operable to connect or disconnect the crank shaft and the transmission gearing, and steering wheels at the front of the tractor.

14. In a tractor, the combination with a frame comprising a housing, a cylinder casing secured to the front wall thereof, a horizontal cylinder extending longitudinally of said casing, a transverse partition in said housing forming separate front and rear chambers therein, transmission gearing in said rear chamber, traction wheels at the rear driven by said transmission gearing, a transversely disposed crank shaft in said front chamber, a piston operating in said cylinder for driving said crank shaft, said front chamber having openings in the opposite side walls thereof between the planes of their upper and lower margins, adjustable bearings for the crank shaft supported by said bearing plates, means operable from the exterior of the housing to adjust said bearings, and steering wheels at the front of the tractor.

15. In a tractor, the combination with a housing, an internal combustion motor mounted in the forward portion thereof, said motor comprising a horizontally-disposed longitudinally-extending cylinder, a transversely-disposed crank shaft, a piston operating in said cylinder and connected with said crank shaft, a cam shaft below and adjacent to said crank shaft, a cam follower shaft below and parallel with said cam shaft, and an oil pocket in said housing adjacent to said follower shaft.

LOUIS W. WITRY.